US008065247B2

(12) United States Patent
Schlottmann

(10) Patent No.: US 8,065,247 B2
(45) Date of Patent: Nov. 22, 2011

(54) SYSTEMS AND METHODS FOR MULTIVARIATE INFLUENCE ANALYSIS OF HETEROGENOUS MIXTURES OF CATEGORICAL AND CONTINUOUS DATA

(75) Inventor: Alan Schlottmann, Henderson, NV (US)

(73) Assignee: Inomaly, Inc., Henderson, NV (US)

( * ) Notice: Subject to any disclaimer, the term of this patent is extended or adjusted under 35 U.S.C. 154(b) by 870 days.

(21) Appl. No.: 12/115,409

(22) Filed: May 5, 2008

(65) Prior Publication Data

US 2009/0132450 A1     May 21, 2009

Related U.S. Application Data

(60) Provisional application No. 60/989,714, filed on Nov. 21, 2007, provisional application No. 61/027,349, filed on Feb. 8, 2008.

(51) Int. Cl.
G06E 1/00 (2006.01)
G06E 3/00 (2006.01)
G06F 15/18 (2006.01)
G06G 7/00 (2006.01)

(52) U.S. Cl. ......................................................... 706/21

(58) Field of Classification Search ........................ None
See application file for complete search history.

(56) References Cited

U.S. PATENT DOCUMENTS

| 6,745,184 B1 | 6/2004 | Choi et al. |
| 7,072,794 B2 | 7/2006 | Wittkowski et al. |
| 7,096,153 B2 * | 8/2006 | Guralnik et al. ............. 702/179 |
| 7,533,070 B2 * | 5/2009 | Guralnik et al. ............. 706/16 |
| 2005/0149297 A1 * | 7/2005 | Guralnik et al. ............. 702/189 |
| 2006/0052945 A1 | 3/2006 | Rabinowitz et al. |
| 2006/0064415 A1 | 3/2006 | Guyon et al. |
| 2009/0234899 A1 * | 9/2009 | Kramer ............................ 708/200 |
| 2010/0036637 A1 * | 2/2010 | Miguelanez et al. ......... 702/118 |

OTHER PUBLICATIONS

Andrews, D. F.; "Significance tests based on residuals"; 1971; Biometrika, vol. 58, No. 1; pp. 139-148.*
Andrews, David F. et al.; "Finding the Outliers that Matter" 1978; Journal of the Royal Statistical Society Series B (Methodological), vol. 40, No. 1; pp. 85-93.*
Hadi, Ali S.; "Identifying Multiple Outliers in Multivariate Data"; 1992; Journal of the Royal Statistical Society Series B (Methodological), vol. 54, No. 3; pp. 761-771.*
Pan, Jian-Xin et al.; "Multiple outlier detection in multivariate data using projection pursuit techniques"; 2000; Elsevier Science B.V.; Journal of Statistical Planning and Inference 83; pp. 153-167.*
PCT International Search Report for PCT/US2008/084210.

(Continued)

Primary Examiner — Jeffrey A Gaffin
Assistant Examiner — Stanley K Hill
(74) Attorney, Agent, or Firm — Cooley, LLP

(57) ABSTRACT

Systems, methods, and computer readable storage medium with executable instructions for detecting outliers and hidden relationships in heterogeneous data sets are provided. Features of the invention pertain to design and operation of various predictive models that identify multivariate outliers and influential observations by recognizing systematic local relationships within heterogeneous data sets or subpopulations of heterogeneous data sets. Multivariate outliers and influential observations are identified by utilizing general distance metrics which are specific to and defined for any number of individual observations within heterogeneous data sets. Aspects of the invention may be applied to sets of data that are large and complex (e.g. loan portfolios, health insurance company data, homeland security profiles, etc.) or sets of data having a more-limited scope (e.g. medical or drug research, etc.).

22 Claims, 6 Drawing Sheets

OTHER PUBLICATIONS

Barrett et al., General classes of influence measures for multivariate regression. Journal of the American Statistical Association, vol. 87, pp. 184-191, 1992.

Caroni, C., Residuals and influence in the multivariate linear model. Statistician vol. 36, pp. 365-370, 1987.

Cook, R.D., Influential observations in linear regression. Journal of the American Statistical Association, vol. 74, pp. 169-174, 1979.

Hornik, et al., Multilayer feedforward networks are universal approximators, Neural Networks, vol. 2, Issue 5, pp. 359-366, 1989.

Kim et al., Detecting multiple outliers in linear regression using a cluster method combined with graphical visualization. Computational Statistics, vol. 22, pp. 109-119, 2007.

Tao et al., Continuous Nearest Neighbor Search. In Proceedings of the 28th VLDB Conference, Hong Kong, China, 2002.

* cited by examiner

SYSTEMS AND METHODS FOR
MULTIVARIATE INFLUENCE ANALYSIS OF
HETEROGENOUS MIXTURES OF
CATEGORICAL AND CONTINUOUS DATA

PRIORITY

The present application claims the benefit of U.S. Provisional Application No. 60/989,714, entitled "Methods And Computer Software For Analyzing Multivariate Outliers Of Heterogeneous Sets Of Data," filed on Nov. 21, 2007, and of U.S. Provisional Application No. 61/027,349 entitled "Methods And Computer Software For Analyzing Multivariate Outliers Of Heterogeneous Sets Of Data," filed on Feb. 8, 2008, the disclosures of which are incorporated herein by reference in their entirety.

FIELD OF THE INVENTION

The invention generally relates to systems and methods for multivariate analysis of outliers and hidden relationships in sets of data. More particularly, the invention is directed to various processes and computer applications for identifying influential observations and/or outliers that exist within heterogeneous data sets of varying scope and complexity.

BACKGROUND OF THE INVENTION

Standard techniques for understanding outliers, and thus hidden relationships, within multivariate data sets are often incomplete or misapplied. Such technology typically includes some type of regression analysis, basic neural networks and/or data mining techniques for identifying observations within a data set. Traditional data mining, for example, often produces unsatisfactory results due to spurious correlations, misleading associations, and illusory relationships. This is due to techniques that often define "patterns" upon noise in the data rather than actual systematic relationships.

In most cases, standard multivariate analysis techniques for identifying influential observations and outliers utilize some variant of multivariate regression; however, regression techniques typically do not predict outliers within groups, but rather predict a conditional mean across data sets. As a result, current methods of analysis in industries ranging from banking to homeland security often overlook systematic local relationships (i.e., relationships that apply to one or more portions of a population or subpopulation), in models that explicitly or implicitly estimate systematic global relationships (i.e., relationships that apply to the population or subpopulation as a whole).

Statements of the vexing problem of outlier identification and unique outlier cells have persisted for decades. Included among the problems are ineffective methods for identifying underlying set of true relationships.

Recent problems confronting private enterprise have heightened awareness of the risks involved in relying on current data analysis tools, particularly in the area of portfolio risk analysis. At the core of this discussion is the problem of measuring systematic global and systematic local variation. State of the art technology typically fails to capture many systematic local relationships within data sets because it applies only global measures. The existing technology falls short of observing cells (or sub-cells) based on shared characteristics derived from the underlying multivariate statistical distributions within a data set. Moreover, such technology does not provide meaningful analysis of systematic local and global variation for each data point. Consequently, state of the art technology typically overlooks potentially critical relationships at the local level that influence the relationship(s) of interest.

SUMMARY OF THE INVENTION

Some embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One aspect of the invention relates to systems, methods, and computer readable storage medium with executable instructions for detecting one or more outlier observations from a global set of observations represented by a multivariate data set that comprises one or more continuous and categorical variables. A first observation and a first group of observations that are nearest to said first observation based on a statistical distance metric are identified from the global set of observations. The first observation is identified as a first outlier observation if residual data of the first observation is statistically different from residual data of the first group of observations. The residual data of the first observation and the first group of observations are determined based on a predictive model indicative of a global relationship between a response variable and a plurality of explanatory variables associated with the global set of observations.

Another aspect of the invention relates to systems, methods, and computer readable storage medium with executable instructions for detecting one or more unique groups of observations from a global set of observations represented by a multivariate data set. A plurality of groups of observations that are each statistically homogenous are identified from the global set of observations. A first group of observations from the plurality is identified as a unique group of observations if residual data of the first group of observations is statistically different from residual data of the other groups in the plurality.

Yet another aspect of the invention relates to systems, methods, and computer readable storage medium with executable instructions for detecting one or more unique groups of observations from a global set of observations represented by a multivariate data set. A first observation is identified from the global data set of observations. A first group of observations that are statistically homogenous and that include the first observation is identified from the global set of observations. A second group of observations that are statistically less homogenous than the first group of observations, and that include at least a plurality of observations from the first group of observations including the first observation, is identified from the global set of observations. The first group of observations is identified as a unique group of observations if residual data of said first observation is not statistically different from residual data of the remaining observations in said first group, and if the residual data of the first observation is statistically different from residual data of the remaining observations in said second group.

As previously stated, the above-described embodiments and implementations are for illustration purposes only. Numerous other embodiments, implementations, and details of the invention can be recognized by those of ordinary skill in the art from the following descriptions and claims.

BRIEF DESCRIPTION OF THE DRAWINGS

Various objects and advantages and a more complete understanding of some embodiments of the invention are apparent and more readily appreciated by reference to the following Detailed Description and to the appended claims when taken in conjunction with the accompanying Drawings wherein:

DETAILED DESCRIPTION

Embodiments of the invention pertain to both the design and operation of various predictive models that identify multivariate outliers and influential observations. An embodiment of the invention identifies multivariate outliers and influential observations using an improved approach that recognizes systematic local relationships within a heterogeneous data set or subpopulations of the heterogeneous data set. Processes described herein may identify multivariate outliers and influential observations by utilizing a general distance metric which is specific to and defined for any number of individual observations within the heterogeneous data set. The general distance metric utilized for multivariate outlier identification can be derived from geometric and/or statistical foundations. In either case, the general distance metric may employ a mixing distribution defined across either of (or both) categorical and continuous variables in the heterogeneous data set.

Embodiments of the invention may be applied to sets of data that are large and complex (e.g. loan portfolios, health insurance company data, homeland security profiles, etc.) or sets of data having a more-limited scope (e.g. medical or drug research, etc.).

Network Environment

Figure 1:
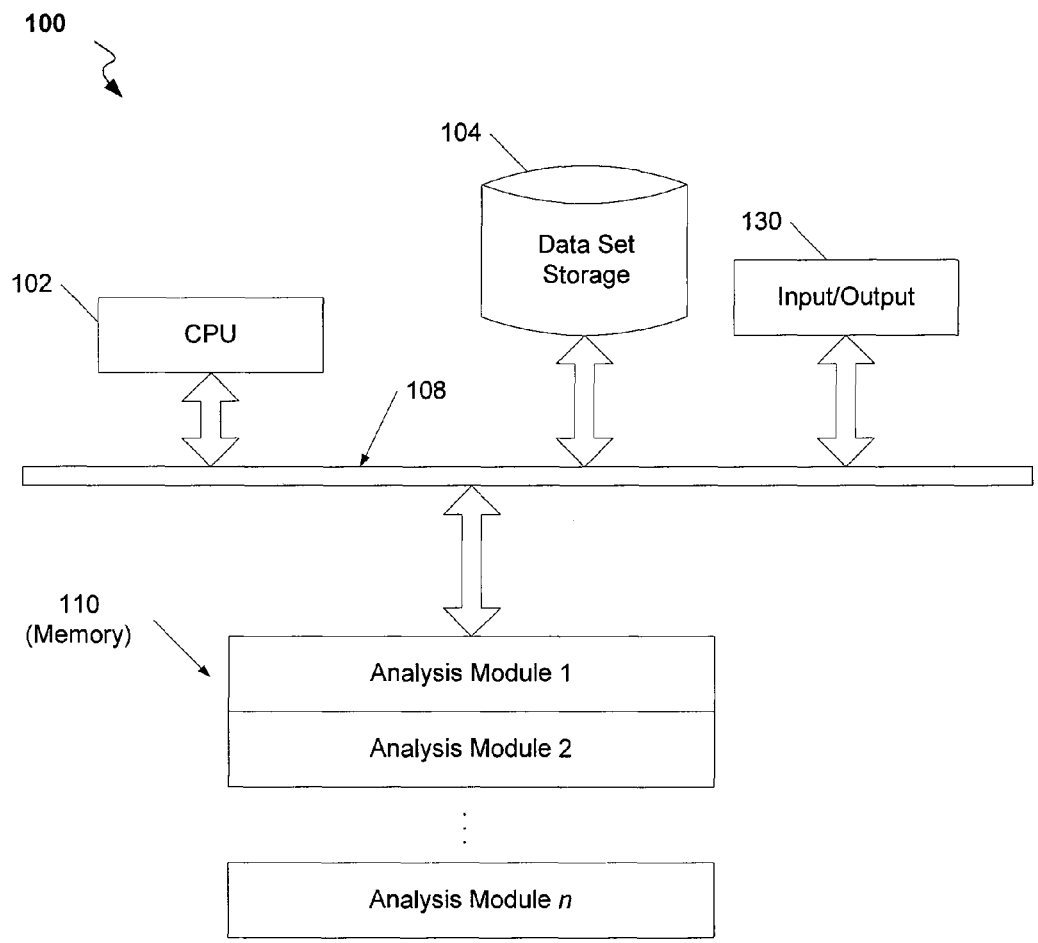
FIG. 1 depicts one embodiment of a networked environment within which certain embodiments of an outlier detection system and method may be practiced in accordance with aspects of the invention.

FIG. 1 illustrates one embodiment of a networked environment 100 within which certain embodiments of the multivariate analysis technique of the invention may be practiced. The environment 100 includes a Central Processing Unit ("CPU") 102, a data storage device 104, intermediate connection devices/pathways 108 (e.g., a bus), an input/output device 130 and memory 110. Memory 110 includes any number of analysis modules for carrying out embodiments of the invention.

Exemplary Process

Figure 2:
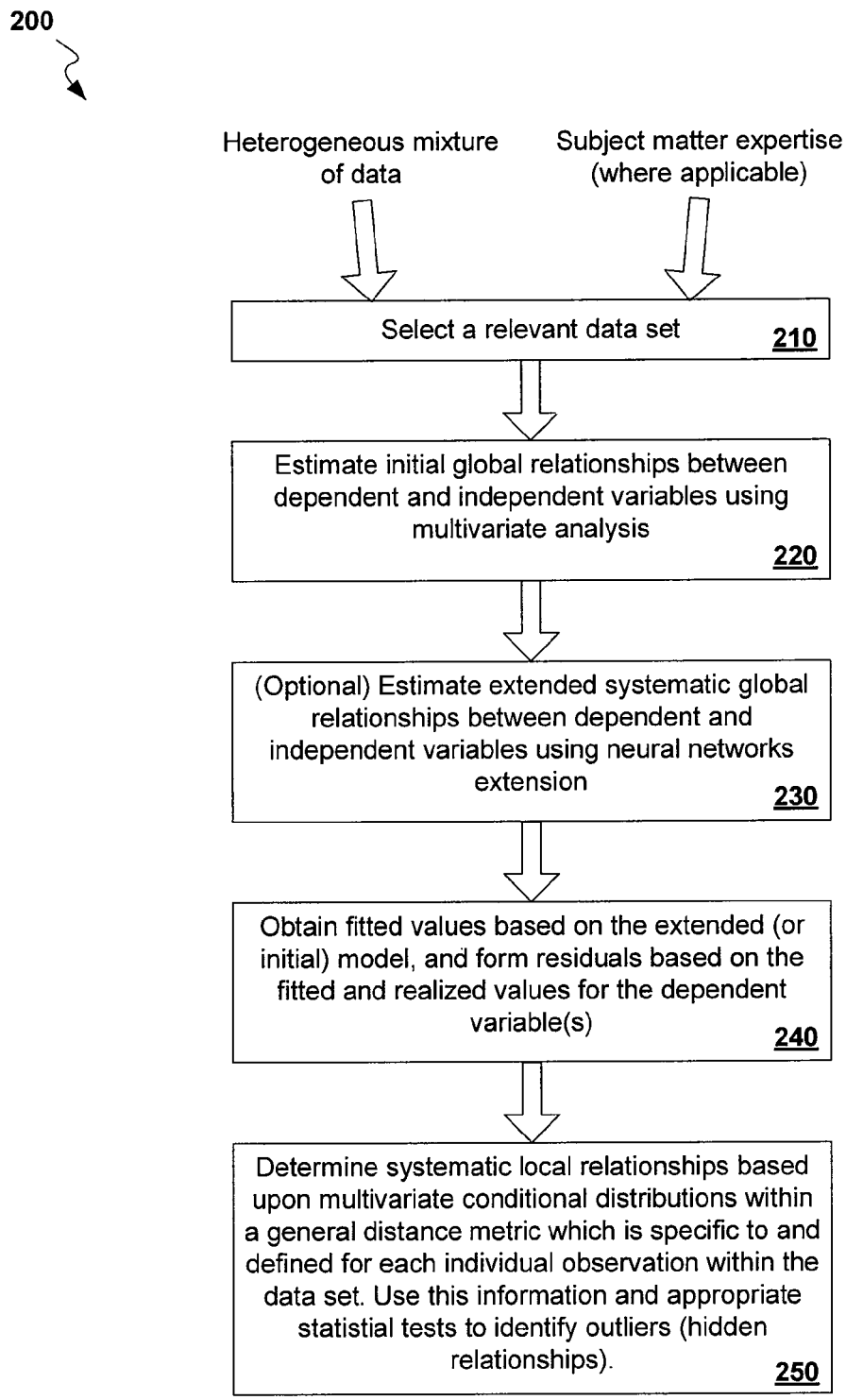
FIG. 2 illustrates a process flow diagram representative of an outlier detection process that is consistent with certain embodiments of the invention.

Turning now to FIG. 2, there is illustrated a process 200 for carrying out certain aspects of the invention in accordance with one or more embodiments. As shown, the process 200 includes operations 210-250, which may be carried out by software running in any number of systems including the network environment 100. One of ordinary skill in the art will appreciate that certain process operations may be rearranged within, omitted from and/or added to the process 200 and other processes described herein.

As shown in operation 210, a relevant data set is selected for multivariate analysis. In at least one embodiment, the relevant data set is determined by subject matter expertise provided by any one of various sources, including knowledgeable experts, expert opinion, industry guidelines, previous analysis, and/or prior experimentation/research, among others. The range of industries in which this embodiment may be practiced present different problems that pertain to unique sets of data of varying scope, and may require distinctive subject expertise in order to properly perform analysis on the data sets.

The data set selected in operation 210 includes observations that include of any number of continuous (e.g., potentially taking any value within a particular range) and categorical variables (e.g., taking discrete values within a range). For example, in the financial industry, a relevant data set may include observations in relation to variables such as interest rate, income, FICO credit score, gender, age and race.

In operation 220, one or more global relationships existing within the data set are estimated to produce an initial model for analyzing outliers of the data set. In accordance with one embodiment, the global relationships are estimated using one or more parametric, nonparametric and/or semi parametric statistical techniques. Examples of parametric statistical techniques are provided in *Applied Regression Analysis and Multivariable Methods*, authored by Kleinbaum et al. Various nonparametric approaches are described in *Nonparametric Econometrics: Theory and Practice*, authored by Li et al., in *All of Nonparametric Statistics*, authored by Wasserman, and in *Nonparametric Nonlinear Regression Models*, authored by Ke et al.

In accordance with other embodiments, the systematic global relationships are estimated using methodology such as one or more linear and/or nonlinear regression techniques, hazard rate analysis techniques, qualitative dependent choice techniques and/or related statistical techniques such as ANOVA or ANCOVA. One of ordinary skill in the art will appreciate that the techniques listed herein are not intended to be an exhaustive list of techniques for estimating global relationships within sets of data. Accordingly, one of ordinary skill in the art will appreciate additional techniques not listed herein that fall within the scope and spirit of the invention.

Figure 3:
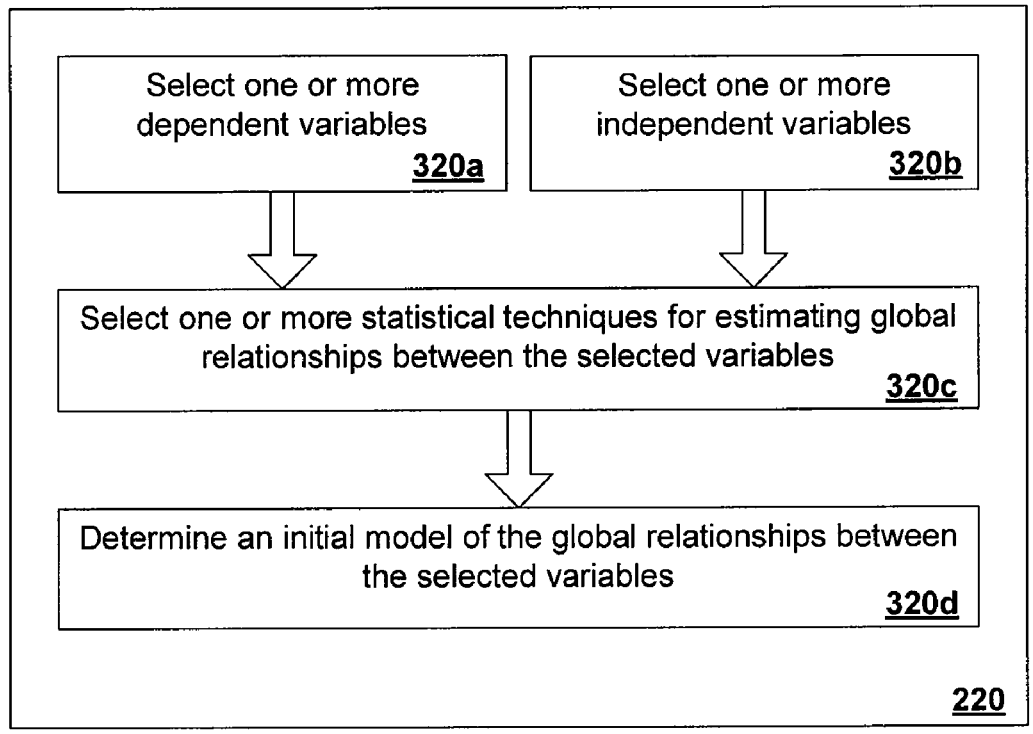
FIG. 3 illustrates a process flow diagram representative of a sub-process for identifying one or more global relationships that exist within a data set in order to produce an initial model for analyzing outliers of the data set.

Attention is now directed to FIG. 3, which illustrates sub-operations 320a-320d of operation 220. In sub-operations 320a and 320b, one or more response variable(s) and explanatory variables (also known as dependent variable(s) and independent variables, respectively) are selected. Upon selection of these variables, one or more statistical techniques for estimating global relationships between the response variable(s) and explanatory variables are identified in sub-operation 320c. Based on the identified technique, an initial model that estimates the global relationships between the response variable(s) and the explanatory variables is determined in sub-operation 320d.

Returning now to FIG. 2, an optional operation 230 may be used to augment the initial model from operation 220 with one or more neural network structures to create an extended model. While the initial model provides an estimated multivariate relationship between response variable(s) and explanatory variables, one or more linear or nonlinear relationships across the data set, which were not captured during operation 220, may exist. Operation 230 addresses this potential gap by utilizing a neural network to further capture systematic global relationships existing within the data set.

In one embodiment, a feed forward neural network with direct linear input connections is utilized to uncover potential systematic relationships that are defined globally over the entire set of data, and that may not have been fully understood a priori. The architecture of the feed forward neural network component of the extended model depends on the complexity of the unknown relationships in the data, and may be determined via approximation theoretic selection techniques, such as those based on cross-validation of the extended model. An overview of the nature of feed forward control, feedback linearization, and neural network control is provided in *A Statistical Approach to Neural Networks for Pattern Recognition*, authored by Dunne, in *Multilayer Feedforward Networks Are Universal Approximators*, authored by Hornik et al., and in *Neural Networks for Modeling and Control of Dynamic Systems: A Practioners Handbook*, authored by Norgaard et al.

Some aspects of the invention utilize nonlinear numerical optimization techniques, as well as subset selection with statistical model selection foundations, rather than utilizing an engineering approach associated with neural networks. In one embodiment, an m-estimator is utilized to obtain statistical estimates of the extended model for a given set of variables within the data set and a given neural network architecture. The use of an m-estimator involves numerical optimization of highly nonlinear multimodal objective functions with many local optima. The numerical optimization is performed using a technique that involves a hybridization of evolutionary computing with sequential quadratic programming. This technique combines a global search engine (algorithm) with a local derivative-based search algorithm in order to find the parameters in the neural network that best fit the data. The technique is also able to efficiently compare different input vectors and architectures for the neural network in order to find those that provide optimal predictions of the variable(s) under consideration. This is done by utilizing principles of approximation theory based on cross validation.

The extended model of operation 230 may incorporate subset selection as suggested in *Multivariate Regressions, Genetic Algorithms, and Informational Complexity: A Three-Way Hybrid*, authored by Bearse et al. Additional subset selection procedures in regression models are described in *Subset Selection in Regression*, authored by Miller.

Attention is now drawn to operation 240 of FIG. 2, during which fitted values (also denoted herein as in-sample predictions) are obtained based on the extended model created in optional operation 230 (or the initial model identified in operation 220 should optional operation 230 be omitted). Note that future reference to the extended or the initial model will be made using the term "global model." The fitted values can be viewed as estimates of the conditional mean of the response variable(s) given the observed values of the explanatory variables. If some of the response variable(s) are binary, then conditional expectations can be viewed as conditional probabilities by suitably choosing the architecture of the global model.

Upon obtaining fitted values, residuals are formed. Residuals are the deviations of the observed values for the response variable(s) in the data set and their fitted values as estimated by the global model. The residuals represent the portion of the response variable(s) that cannot be explained by systematic global relationships that apply to the population captured within the data set as a whole.

Some aspects of the invention recognize that while the residuals represent the portion of the dependent variables that cannot be explained by systematic global relationships this does not rule out the existence of systematic local relationships within or between elements of subpopulations. Any such local relationships may be identified by modeling the continuous input variables themselves as realizations from a multivariate mixture distribution, where the mixing proportions are determined via the relative frequencies of the combinations of the categorical input variables. This allows certain embodiments of the invention to search for those input combinations that are most similar even when both categorical and continuous explanatory variables are present.

Pre-existing techniques for the detection of multivariate outliers/influential observations fall into three general categories:

(i) significant differences of realized values from predicted values;

(ii) substantial changes in the estimated parameters determining the conditional mean function; and (iii) statistical analysis of the residuals, including clustering of residuals into a number of groups.

Certain aspects of the invention for detecting multivariate outliers/influential observations explicitly allow for and determine systematic, but local, relationships that may exist between explanatory variables and dependent variables. In this regard, certain embodiments of the invention detect local, but systematic, relationships that cannot be found using pre-existing regression-like analysis or residual-based approach alone. Thus, these embodiments do not necessarily involve traditional clustering techniques on residuals or traditional nearest neighbors analysis among residuals.

As described herein, certain embodiments uniquely identify multivariate outliers and influential observations by utilizing a general distance metric which is specific to and defined for any number of individual observations within the heterogeneous data set. The general distance metric utilized for multivariate outlier identification can be derived from geometric and/or statistical foundations. In either case, the general distance metric may employ a mixing distribution defined across either (or both) categorical and continuous variables in the heterogeneous data set.

Figure 4:
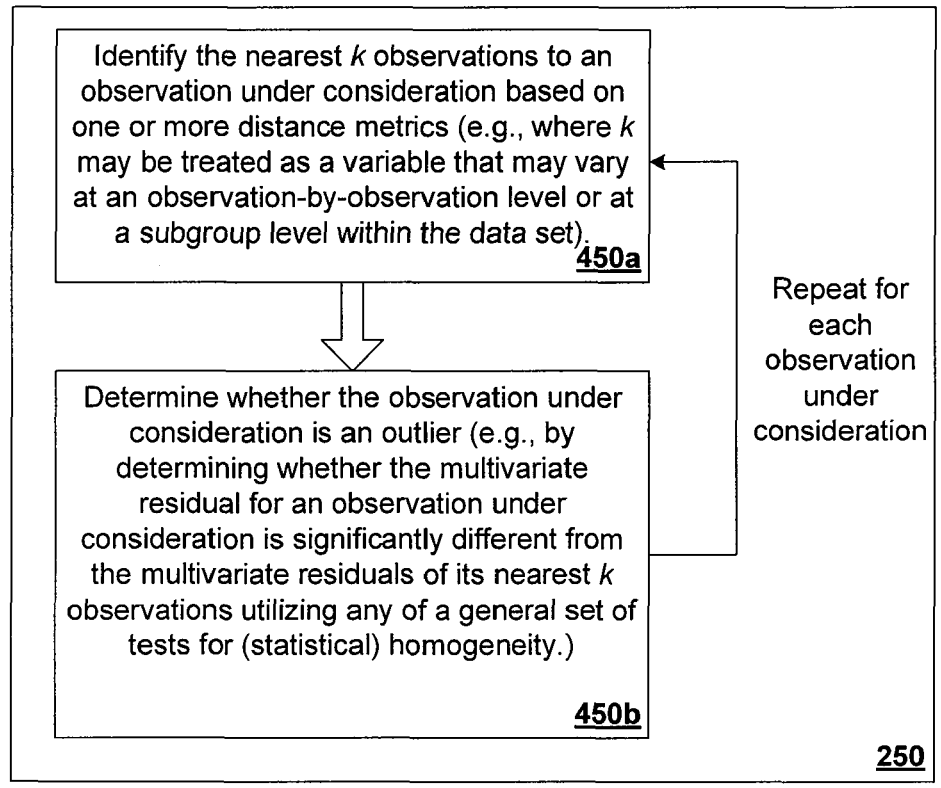
FIG. 4 illustrates a process flow diagram representative of a sub-process for identifying one or more systematic local relationships that exist between observations in a data set in order to determine whether particular observations are outliers.

While referring to operation 250 of FIG. 2, which illustrates one aspect of the invention, simultaneous reference will be made to FIG. 4, which depicts sub-operations 450*a*-450*b* carried out during operation 250. According to operation 250, systematic local relationships are identified. In sub-operation 450*a*, the nearest k observations for an observation under consideration (also denoted as an observation of interest) are identified. During sub-operation 450*a*, as explained above, the entire set of observations in the data set are not separated into clusters. Instead, a unique group of observations (i.e., the nearest k observations) are identified for each observation under consideration.

The value of k may be predefined or, in accordance with one aspect of the invention, treated as a variable. Under the latter scenario, k may be selected via approximation theoretic techniques. In this manner, it is possible, using cross-validatory techniques, to select an 'optimal' value of k that differs for each observation of interest.

By way of example, the value of k may be determined by testing different values of k using a sample of observations in the data set or the data set as a whole. Under these circumstances, an optimal value of k is one that best captures a homogenous group of observations (based on similarity between the continuous independent variables) by balancing the statistical reliability (also known as variability) of the sample mean vector and the distance between the two least alike observations of the group defined by k. One of ordinary skill in the art will appreciate that, in accordance with at least one embodiment, the value of k depends on the data set as a whole or the sample taken from the data set. One of ordinary skill in the art will alternatively appreciate that, in accordance with at least one additional embodiment, the value of k is dependent on an observation under consideration, and may differ for additional observations under consideration that belong to the same global data set. In such a case, k is determined for each observation under consideration using approximation theoretic techniques, including those that balance statistical reliability (also known as variability) and the distance between the two least alike observations.

As noted above, sub-operation 450a identifies the nearest k observations. A 'nearest' observation has explanatory variables that are most similar to the observation under consideration with respect to other observations. By way of example, similarity between observations may be determined by using a distance metric such as, but not limited to, the Euclidean distance metric, the Mahalanobis distance metric, the Minkowski distance metric, or, more generally, other measures suitable for determining the distance between multivariate probability distributions. Alternatively, the similarity may be based on the manner in which random vectors move together such as, but not limited to, multivariate generalizations of Pearson's correlation and Spearman's rank correlation. In at least one embodiment, the distance metric measures the distance between two observations based on their estimated realizations from an estimated multivariate distribution. In such an embodiment, the distribution may be defined across any number of the categorical and/or continuous explanatory variables.

In accordance with at least one embodiment, a 'nearest' observation may be determined by modeling one or more of the explanatory variables (e.g., one or more of the continuous or categorical explanatory variables) as one or more realizations from a multivariate mixture distribution derived, at least in part, from other explanatory variables (e.g., one or more of the categorical or continuous explanatory variables, respectively). For example, the mixing proportions of the distribution may be determined via the relative frequencies of the combinations of one or more of the other explanatory variables. Thus, the process identifies explanatory variable combinations that are most similar even when both categorical and continuous explanatory variables are present. In certain embodiments, for example when there are no categorical independent variables, mixture models may be fitted to continuous multivariate data with unobserved components. One of ordinary skill in the art will appreciate alternative approaches for determining similarity that are within both the spirit and scope of the invention.

Having found the k nearest observations for an observation under consideration, the process 200 determines, in sub-operation 450b, whether the observation under consideration is an outlier with respect to its local relationship to its nearest k observations.

For example, the observation under consideration may be identified as an outlier if its multivariate residual identified in operation 240 is statistically different from the multivariate residuals (also identified in operation 240) of its nearest k observations. Statistically difference between multivariate residuals may be judged via any number of techniques that test for statistical homogeneity, including techniques that test for differences between vectors of means or more comprehensive tests for differences between multivariate probability distributions.

By way of example and not of limitation, A. W. van der Vaart's Asymptotic Statistics describes certain techniques that can be used to determine the approximate statistical distribution of tests for statistical homogeneity. Certain embodiments may incorporate this kind of asymptotic distribution theory to derive approximate finite sample statistical distributions for the test statistics that are used to determine whether the residual of the observation under consideration is statistically different from the residuals of its k nearest observations. One of ordinary skill in the art will recognize alternative techniques that are within both the scope and spirit of the invention. As shown in FIG. 4, sub-operations 450a-450b may be repeated for any number of observations that reside in the data set.

Applications of the Embodiment Process

Embodiments of the invention can be practiced in a wide variety of applications. For example, the invention may be used in relation to "within group" comparisons, which encompass finding multivariate observations that are unusual within a particular subpopulation of the global data set. Such an approach may be practiced in a range of applications from homeland security to auditing.

By way of another example, embodiments of the invention may be used in relation to "between group" comparisons, which encompass determining whether an observation within one subpopulation is significantly different from observations within another subpopulation. Such an approach may be practiced in applications such as fair lending and salary/promotion audits, as well as other Equal Employment Opportunity Commission ("EEOC") issues.

As mentioned above, an important feature of several embodiments of the invention provides that k be treated as a variable. By treating k as a variable, homogenous but unusual groupings of observations may be identified. For example, when k is relatively small, the process described above may find that a particular set of observations appears to be statistically similar at a local level. As the value of k increases, and more observations are added to the particular set of observations to create a larger set of observations, the statistical similarity lessens in relation to the observations in the larger set of observations. At some critical value of k, the observations in the larger set of observations are statistically dissimilar (or fail to meet a threshold of statistical similarity). Accordingly, certain sets of observations for values of k less than the critical value of k, are identified as unique cells/unique groups.

Additional methods for detecting unique cells are contemplated. For example, distinct sets of statistically similar observations may be identified and compared to each other in a similar manner to that described above in relation to "within-group" and "between-group" comparisons. In such a method, residual data for a particular set of statistically similar observations may be compared to residual data for the remaining sets of statistically similar observations. The particular set of statistically similar observations is identified as a unique cell if the comparison determines that the residual data for the particular set of statistically similar observations is statistically different than the residual data for the remaining sets of statistically similar observations.

One of ordinary skill in the art will appreciate that certain embodiments of the invention are designed to be scalable and to interface, as a back-end application, with technology currently in the market. Such technology may include modeling techniques for identifying global relationships.

Illustration of Outlier Detection in Accordance with Certain Embodiments

The following embodiment illustrates, by way of example, certain aspects of the present invention. One of ordinary skill in the art will appreciate that the aspects set forth below are non-limiting, and other embodiments fall within both the spirit and scope of the invention.

In accordance with this illustration, the network 100 identifies relevant data. The data are related to a set number of observations (e.g., one thousand (1,000) observations). Identification of the data may be carried out via exploratory techniques (e.g., data mining, statistical analysis methods, etc.). For the purpose of this illustration, the data has been identified to determine discrimination in relation to home loans ex post. One of ordinary skill in the art will appreciate that certain features of the embodiment are equally applicable for qualifying a customer for a home loan ex ante.

The data related to the one thousand (1,000) observations include four variables as identified by subject matter expertise: (i) interest rate; (ii) credit score; (iii) gender; and (iv) race. Each observation has an associated interest rate, credit score (e.g., a FICO credit score); gender designation (e.g., male or female); and race designation (e.g., black or white, for the sake of simplicity). For simplicity, the 1,000 observations are split equally between male and female. The same is true for race—that is, 500 observations are white and 500 observations are black.

Upon identifying the relevant data, a variable or set of variables of interest is selected. Such selection is best made via subject matter expertise (e.g., in this case a loan officer); however, one of ordinary skill in the art will appreciate alternative methods for making such a selection. For the purposes of this example, the variable of interest is the interest rate variable.

The remaining variables (i.e., credit score (c), gender (g) and race (r)) are explanatory variables. One of skill in the art will recognize that credit score is a continuous variable, while gender and race are categorical variables.

Once the variable of interest is selected, the network 100 determines an appropriate multivariate analysis technique for application to the data in order to produce an initial model that estimates systematic global relationships existing within the data. Various multivariate analysis techniques may be used, including linear or non-linear techniques, and parametric, non-parametric or semi-parametric regression techniques. Alternative techniques include hazard rate analysis techniques, qualitative dependent choice techniques and statistical techniques such as ANOVA or ANCOVA. One of ordinary skill in the art will appreciate additional techniques that are within the spirit and scope of the present invention.

By way of example, the initial model may be represented by the function $$y_{estimate} = f(c,g,r) = \alpha + \beta_{1,estimate}c + \beta_{2,estimate}g + \beta_{3,estimate}r + \epsilon,$$

wherein $y_{estimate}$ represents the estimated interest rate for given values of c, g and r, $\alpha$ represents an estimated constant, $\beta_{1,estimate}$ represents an estimated multiplier (coefficient) applied to the credit score c, $\beta_{2,estimate}$ represents an estimated multiplier (coefficient) applied to the gender value g, and $\beta_{3,estimate}$ represents an estimated multiplier (coefficient) applied to the race value r. The network 100 may optionally augment the initial model by adding a neural network structure; however, for the purposes of this illustration, this optional operation involving augmentation is omitted.

After the initial model has been determined, the network 100 identifies residuals for some or all of the observations. A residual is the deviation of the actual variable of interest (e.g., an interest rate y observed in the data) from the predicted variable of interest ($y_{estimate}$) for given values c, g and r based the global model. Residuals represent characteristics of the relationship between the interest rate and its explanatory variables (c, g, and r) that cannot be explained by the global model. A residual ($R_1$) for a particular observation may be represented by the function $$R_1 = y_1 - y_{1,estimate}(c_1, g_1, r_1),$$

wherein the subscript '1' denotes the particular observation (e.g., the first observation of one thousand (1,000) observations).

Upon identifying the residuals for each observation, one or more systematic local relationships existing between the variables of select groups of observations are identified in order to determine whether particular observations within the select groups are outliers.

When identifying local relationships, the network 100 compares an observation under consideration to its nearest k observations. For the purposes of this illustration, k equals 30; however, as described above k may be treated as a variable that is derived based on the particular data set or the particular observation under consideration. A 'near' observation has explanatory variables that are most similar to the observation under consideration with respect to other observations in the subpopulation. By way of example, similarity between observations may be determined by using a distance metric that relies on an estimated multivariate distribution defined across the categorical and/or continuous independent variables. One of ordinary skill in the art will appreciate alternative approaches for determining similarity that are within both the spirit and scope of the invention.

Once the appropriate k observations are identified, the residual of the observation under consideration is compared to residuals of its nearest k observations to determine if the observation under consideration is an outlier.

In a first implementation of this illustration, the network 100 compares the residual of an observation under consideration, which pertains to a particular categorical subpopulation of the data (e.g., females), to the residuals of its nearest k observations, which also pertain to the same categorical subpopulation. This type of comparison is called a "within-group" or "within-subpopulation" comparison. When the residual of the observation under consideration is statistically different than the residuals of its nearest k observations, as determined using one or more tests for statistical homogeneity, then the observation under consideration is identified as an outlier. Otherwise, the observation under consideration is not identified as an outlier.

In a second implementation, the network 100 compares the residual of the same observation under consideration as identified above to the residuals of its nearest k observations in relation to a different subpopulation (e.g., males). This type of comparison is called a "between-group" or "between-subpopulation" comparison. When the residual of the observation under consideration is statistically different than the residuals of its nearest k observations in the different subpopulation, then the observation under consideration is identified as an outlier. Otherwise, the observation under consideration is not identified as an outlier. By way of example, an outlier found during this "between-group" comparison could indicate discrimination—for example, the female's interest rate may be statistically higher/worse than that of the males that share her characteristics (e.g., credit score).

Note that race has been marginalized in the second implementation described above. In order to achieve the marginalization of race the network 100 identifies an estimated joint distribution of the independent variables. The joint distribution may be denoted as $$f_{c,g,r}(c,g,r) = f_{g,r}(g,r) \times f_{c|g,r}(c|g,r),$$

where $f_{g,r}(g,r)$ denotes the joint probability mass function of gender and race, and $f_{c|g,r}(c|g,r)$ denotes the density of credit score conditional on gender and race. By summing over the race category values, black and white, the following function is obtained:

$$f_{c,g}(c,g) = f_g(g) \times f_{c|g}(c|g),$$

where $f_{c,g}(c,g)$ denotes the joint probability mass function of credit score and gender, and $f_{c|g}(c|g)$ is the density of credit score conditional on gender. Having performed this marginalization, the network 100 computes the distance of the observation under consideration (e.g., a female with a particular credit score) from other observations (e.g., males with similar credit scores) to identify the k observations that are nearest to the observation under consideration in terms of credit score. For example, the network 100 may compute the Mahalanobis distance between the female's credit score and the credit scores of each male in order to determine the k observations that are most similar to the observation under consideration.

In a third implementation, the network 100 compares a particular grouping of observations (denoted as a "unique cell") to other observations or groupings of observations within the data set. A cell includes a plurality of observations that have been found to be statistically homogenous (also denoted as statistically similar) relative to other, comparable observations in the data set. This process is useful for identifying hidden grouping structures among larger groupings of observations whose qualitative characteristics are similar (or identical).

In a first embodiment of the third implementation, unique cells are detected by performing successive (or parallel) "within-group" analyses for a particular observation under consideration, each analysis being performed using a different (e.g., escalating) value of k. In such an embodiment, a cell is identified by analyzing the pattern of the within-group test statistics for outliers as a function of k. An indication of a cell may occur when a set of within-group test statistics are insignificant for small values of k, but become more and more significant as the value of k grows. For example, if the fifteen (15) nearest observations to a particular observation under consideration fail to identify the observation under consideration as an outlier, the network 100 will perform an additional "within-group" analysis for that observation under consideration using a higher number of nearest observations such as thirty (30). If the observation under consideration is identified as an outlier with respect to its thirty (30) nearest observations, then the grouping of its fifteen (15) nearest observations is identified as a possible cell that requires further analysis. Further analysis may be performed using human subject matter expertise (e.g., manual review of the data). Alternatively, further analysis may be performed using a process similar to the one described below with respect to a second embodiment of the third implementation.

In a second embodiment of the third implementation, one grouping of near observations is compared to other groupings of near observations. The comparison follows the same process as the "within-group" analysis; however, instead of comparing individual observations, the network 100 compares groupings of observations—that is, the network 100 compares a cell under consideration to its k nearest cells to determine whether the cell under consideration is an outlier cell. In order to make the comparisons between cells, residual data for each observation can be combined using one or more known test statistics on a per cell basis. For example a residual value representative of a cell can be calculated using weighted sums of residuals for each observation in the cell, where the weights depend on the distance between the independent variables of a particular observation and those of the remaining observations.

Figure 5:
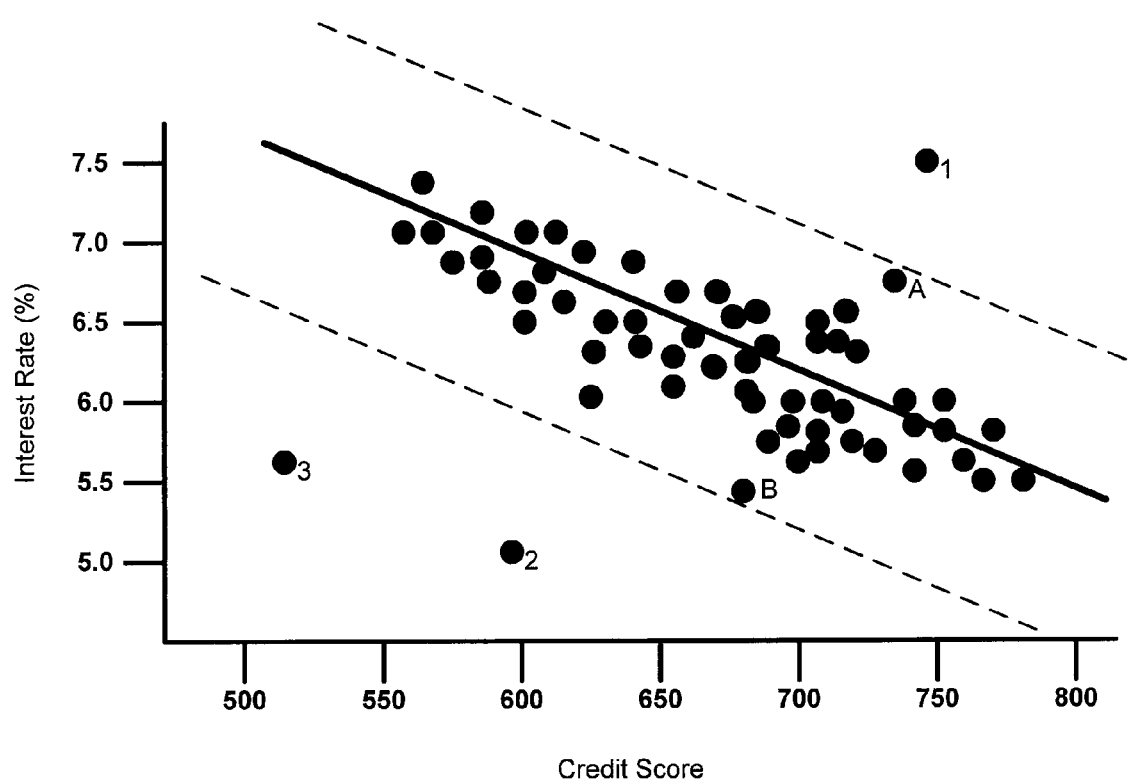
FIGS. 5 and 6A-B illustrate certain aspects of the invention.
Figure 6A:
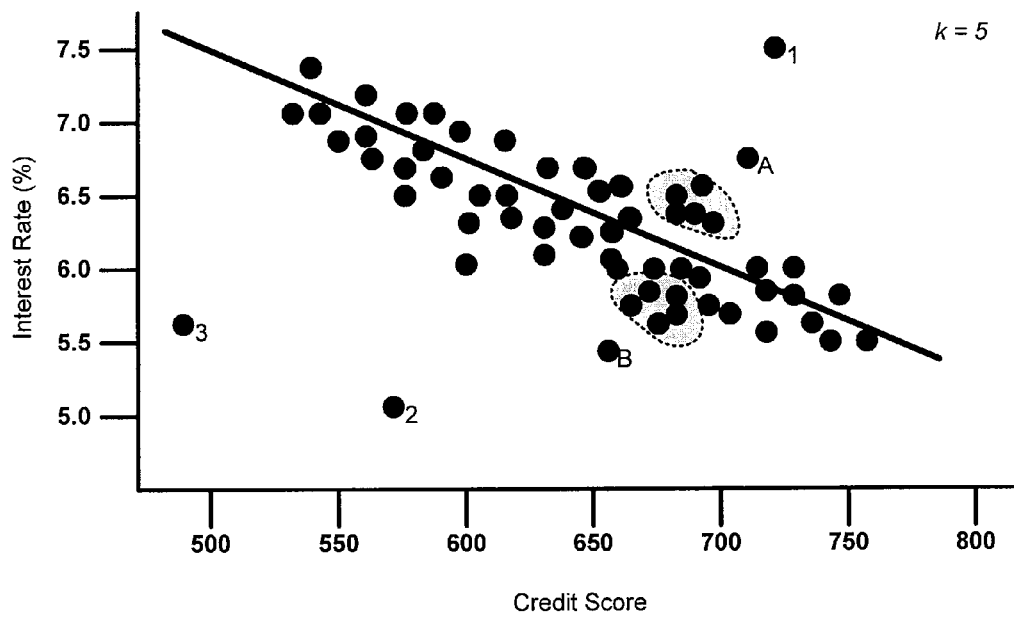
Figure 6B:
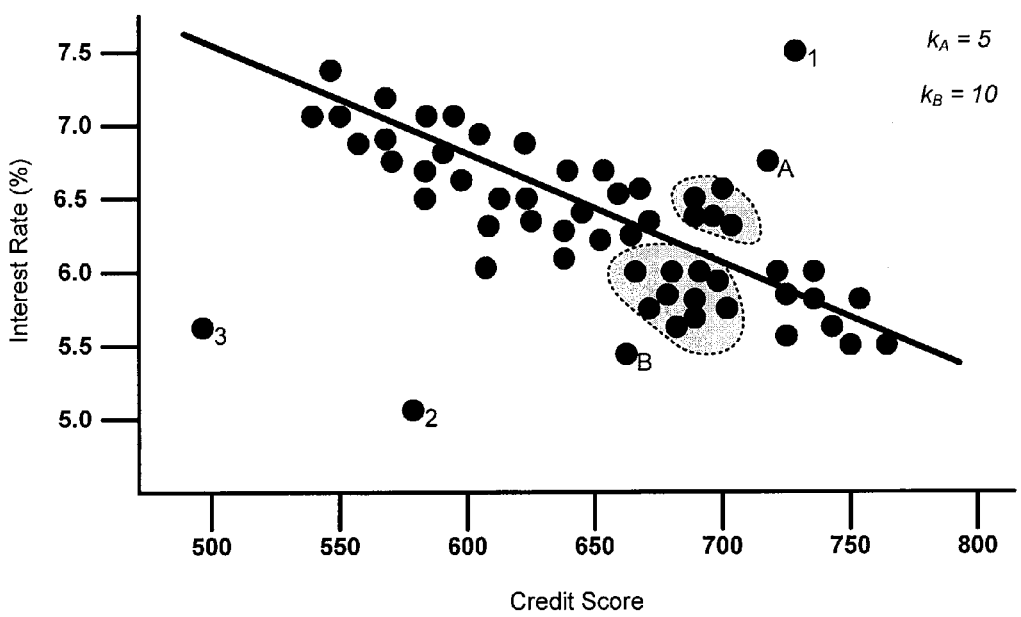

Pictorial Illustration of Outlier Detection in Accordance with Certain Embodiments Attention is now drawn to FIGS. 5, 6A and 6B, which are included to further illustrate certain aspects of the invention. FIG. 5 depicts a simple regression model and a confidence interval for Interest Rate as a function of Credit Score. As shown, observations 1-3 fall outside the confidence interval and are therefore identified as outliers. Also shown are observations A and B, which do not fall outside the confidence intervals and are therefore not identified as outliers using the simple regression model.

FIGS. 6A and 6B each show the same simple regression model of FIG. 5. One of ordinary skill in the art will appreciate that FIGS. 6A and 6B are stylized in order to illustrate certain aspects of the invention; however, FIGS. 6A and 6B do not necessarily depict how embodiments of the invention operate in all instances. FIGS. 6A and 6B are therefore non-limiting illustrations.

One aspect illustrated in FIGS. 6A and 6B pertains to the identification of observations A and B as outliers when compared to certain characteristics (e.g., residuals) of their nearest k observations, which are denoted within dotted and shaded boundaries. Therefore, unlike the simple regression model approach, observations A and B are properly identified as outliers One of ordinary skill in the art understands that the nearest k observations shown in FIGS. 6A and 6B are depicted as the observations that are closest to observations A and B in relation to the global model (i.e., the simple regression model), and that this depiction is not intended to limit identification of an observation of interest's nearest k observations to those that are closest to that observation of interest in relation to a global model.

Another aspect illustrated in FIGS. 6A and 6B pertains to the treatment of k as a variable that may differ between any two observations of interest (e.g., observations A and B).

Applications of Certain Embodiments of the Invention

One or more aspects of the invention may be practiced within a non-limiting, broad range of applications. For example, embodiments may optimize duration analysis, survival analysis, and the modeling of time to event data. Such optimization to the analyses and modeling is directly applicable to a wide range of medical and biotech issues (identifying how long a dose of a drug maintains health, identifying how many years a patient survived after a set of therapies, etc.), failure in mechanical systems (e.g., improving computerized machine tool performance by analyzing mean time to failure and mean time to repair data), and even failure in relation to a criminal system (e.g., identifying the how long former convicts commit a crime after they've been released).

In an additional application, an embodiment of the invention may be used to rapidly identify terrorists and/or terrorists cells utilizing large sets of telephonic data information (or other data relevant to national security).

Embodiments of the invention may also substantially reduce the "time-to-market" and Federal Drug Administration (FDA) approval process. Moreover, embodiments of the invention may lead to increases in the efficacy of products based upon a better understanding of medical constellation data.

By way of another example, embodiments of the invention may provide for optimized governance, compliance and risk assessments in a variety of areas such as the mortgage industry, EEOC regulations, Sarbanes-Oxley (SOX) or privacy laws. Embodiments of the invention are particularly relevant to applications such as fair lending and salary/promotion audits as well as other EEOC issues.

In accordance with some embodiments, the invention is designed to facilitate systems development (e.g., relational databases and AI/BI/NN/DSS). Current relational databases are designed based on perceptions of relationships and thus can normalize the datasets into the separate entities, reducing or eliminating anomalies caused by traditional designs. Some embodiments operate to find new relationships for system designs to factor in less obvious or previously unknown relationships between entities.

The invention is also intended, in some embodiments, to identify outliers (e.g., risk) within portfolios. Such embodiments may involve "within group" comparisons (i.e., finding multivariate observations that are unusual within a subpopulation) as well as "between group" comparison (i.e., determining whether an observation within one subpopulation is significantly different from observations within another subpopulation).

Alternatively, some embodiments may detect customer trends in relation to marketing applications and product development opportunities. For example, at least one embodiment could be utilized in customer relationship management, allowing enterprises to better predict customer behavior in real time.

As mentioned above, the process may be embodied into software. Such software may be directly applicable to a service oriented architecture that offers a unique competitive advantage within, for example, next generation business enterprise systems and EEOC platforms.

An embodiment of the invention relates to a computer storage product with a machine-readable storage medium having computer code or executable instructions thereon for performing various computer-implemented operations. The term "machine-readable storage medium" is used herein to include any medium that is capable of storing or encoding a sequence of executable instructions or computer codes for performing the operations described herein. The media and computer code may be those specially designed and constructed for the purposes of the invention, or they may be of the kind well known and available to those having skill in the computer software arts. Examples of machine-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, executable instructions.

The foregoing description, for purposes of explanation, used specific nomenclature to provide a thorough understanding of the invention. However, it will be apparent to one skilled in the art that the specific details are not required in order to practice the invention. In other instances, well-known devices are shown in block diagram form in order to avoid unnecessary distraction from the underlying invention. Thus, the foregoing descriptions of specific embodiments of the invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

This application incorporates by reference the citations above and the following: Barrett et al., *General classes of influence measures for multivariate regression*. Journal of the American Statistical Association. Volume 87, pages 184-191, 1992; Bearse et al., *Multivariate Regressions, Genetic Algorithms, and Informational Complexity: A Three-Way Hybrid*, in Nishisato et al., *Measurement and Multivariate Analysis*, Springer, 2002; Belsley et al., *Regression Diagnostics*, Wiley, 1980; Bishop, Christopher M., *Neural Networks for Pattern Recognition*, Oxford University Press, 1995; Bishop, Christopher M., *Neural Networks and Machine Learning*, Springer, 2006; Caroni, C., *Residuals and influence in the multivariate linear model*. Statistician. Volume 36, pages 365-370, 1987; Cook, R. D., *Influential observations in linear regression*. Journal of the American Statistical Association, Volume 74, pages 169-174, 1979; Dunne, Robert A., *A Statistical Approach to Neural Networks for Pattern Recognition*, Wiley Series in Computational Statistics, Wiley, 2007; Hair et al., *Multivariate Data Analysis, 6$^{th}$ Edition*, Prentice Hall, 2006; Hornik, et al., *Multilayer feedforward networks are universal approximators*, Neural Networks, Volume 2, Issue 5, pages 359-366, 1989; Ke et al., *Nonparametric Nonlinear Regression Models*, Technical Report #385, Department of Statistics and Applied Probability, University of California-Santa Barbara, 2002; Kim et al., *Detecting multiple outliers in linear regression using a cluster method combined with graphical visualization*. Computational Statistics, Volume 22, pages 109-119, 2007; Kleinbaum et al., *Applied Regression Analysis and Multivariable Methods*, Duxbury Press, 2007; Li et al., *Nonparametric Econometrics*, Princeton University Press, 2007; Manski, Charles F., *Identification for Prediction and Precision*, Harvard University Press, February 2008; McLachlan et al., *Finite Mixture Models*, Wiley, 2004; Miller, Alan; *Subset Selection in Regression*, Chapman and Hall, 2002; Norgaard et al., *Neural Networks for Modeling and Control of Dynamic Systems: A Practioners Handbook*, Advanced Textbooks in Control and Signal Processing, Springer, 2003; Silverman, Bernard W. *Density Estimation for Statistics and Data Analysis*. Chapman and Hall, 1986; Tao et al., *Continuous Nearest Neighbor Search*. In Proceedings of the 28$^{th}$ VLDB Conference, Hong Kong, China, 2002; van der Vaart, A. W., *Asymptotic Statistics*, Cambridge University Press, 2000; Wasserman, Larry, *All of Nonparametric Statistics*, Statistical Series, Springer, 2007; and Welsch, R. E., *Influence functions and regression diag-*

*nostics*, in Launer, R., Siegel, A. (Eds.), *Modern Data Analysis*, Academic Press, New York, 1982.

What is claimed is:

1. A method for processing a global set of observations represented by a multivariate data set, comprising:

identifying, from said global set of observations, a first observation;

identifying, from said global set of observations, a first group of observations that are nearest to said first observation based on a distance metric;

identifying said first observation as a first outlier observation if a residual of said first observation is statistically different from residuals of said first group of observations, wherein said residuals of said first observation and said first group of observations are determined based on a predictive model indicative of a global relationship between a response variable and at least one explanatory variable of said global set of observations; and storing an indication that said first observation is said first outlier observation when said residual of said first observation is statistically different from said residuals of said first group of observations.

2. The method of claim 1, wherein the distance metric is derived from geometric or statistical foundations.

3. The method of claim 1, wherein the distance metric uses a mixing distribution defined across one or more categorical and continuous variables in the multivariate data set.

4. The method of claim 1, wherein said predictive model is derived using a non-linear or linear statistical technique selected from the group of parametric regression, non-parametric regression and semi-parametric regression.

5. The method of claim 1, wherein said predictive model is derived using hazard rate analysis techniques.

6. The method of claim 1, wherein said predictive model is derived using qualitative dependent choice techniques, ANOVA statistical techniques or ANCOVA statistical techniques.

7. The method of claim 1, wherein said distance metric is identified by computing the distance between said first observation and each observation of said first group of observations.

8. The method of claim 1, wherein said distance metric is identified using a mixing distribution of continuous and categorical variables that are included among continuous and categorical variables of said global set of observations.

9. The method of claim 1, wherein said distance metric is based on a first set of explanatory variable values for said first group that are more similar to a second set of explanatory variable values for said first observation than a third set of explanatory variable values for other observations from said global set of observations.

10. The method of claim 1, wherein said first group has fewer observations than the number of observations in said global set of observations.

11. The method of claim 1, further comprising:

identifying, from said global set of observations, a second observation;

identifying, from said global set of observations, a second group of observations that are nearest to said second observation;

identifying said second observation as a second outlier observation if a residual of said second observation is statistically different from residuals of said second group of observations, wherein said residuals of said second observation and said second group of observations are determined based on said predictive model indicative of said global relationship between said response variable and at least one explanatory variable of said global set of observations; and storing an indication that said second observation is said second outlier observation when said residual of said second observation is statistically different from said residuals of said second group of observations.

12. The method of 11, wherein at least one observation in said second group of observations is included in said first group of observations.

13. The method of 11, wherein the number of observations in said first group equals the number of observations in said second group.

14. The method of 11, wherein the number of observations in said first group does not equal the number of observations in said second group.

15. The method of claim 1, further comprising:
augmenting said predictive model using a neural network.

16. The method of claim 1, further comprising:

identifying, from said global set of observations, a second group of observations that are nearest to said first observation, wherein the number of observations in said second group is greater than the number of observations in said first group;

determining that said first group and said first observation form a unique group of observations if said residual of said first observation is statistically comparable to said residuals of said first group, and if said residual of said first observation is statistically different from residuals of said second group; and storing an indication that said first group and said first observation form said unique group of observations when said residual of said first observation is statistically comparable to said residuals of said first group, and when said residual of said first observation is statistically different from said residuals of said second group.

17. The method of claim 1, further comprising:

identifying, if said residual of said first observation is statistically comparable to residuals of said first group of observations, a plurality of groups of observations that are each statistically homogenous;

determining that said first group and said first observation form a unique group of observations if residuals of said first observation and said first group are statistically different from residuals of said plurality of groups of observations; and storing an indication that said first group and said first observation form said unique group of observations when said residuals of said first observation and said first group are statistically different from said residuals of said plurality of groups of observations.

18. The method of 17, wherein at least one group from said plurality includes one or more observations in said first group.

19. The method of claim 1, wherein said multivariate data set includes statistical data pertaining to complaints of employment discrimination, and wherein a conclusion that said first observation is said first outlier observation indicates violation of an employment discrimination statute or rule.

20. A method for detecting one or more unique groups of observations from a global set of observations represented by a multivariate data set, comprising:

identifying, from said global set of observations, a first observation;

identifying, from said global set of observations, a first group of observations that are statistically homogenous, wherein said first group of observations include said first observation;

identifying, from said global set of observations, a second group of observations that are statistically less homogenous than said first group of observations, wherein said second group of observations include, in addition to other observations from said global set of observations, at least one observation from said first group of observations including said first observation;

determining that said first group of observations is a unique group of observations if residual data of said first observation is statistically comparable to residual data of the remaining observations in said first group, and if said residual data of said first observation is statistically different from residual data of the remaining observations in said second group; and storing an indication that said first group of observations is said unique group of observations when said residual data of said first observation is statistically comparable to said residual data of said remaining observations in said first group, and when said residual data of said first observation is statistically different from said residual data of said remaining observations in said second group.

21. A computer system for detecting one or more outlier observations from a global set of observations represented by a multivariate data set that comprises one or more continuous and categorical variables, comprising:

at least one processor;

a network interface for receiving data from at least one data source;

a memory for storing logical instructions, operatively coupled to the at least one processor, wherein execution of the logical instructions by the processor results in the performing of at least the following operations:

identifying, from said global set of observations, a first observation;

identifying, from said global set of observations, a first group of observations that are nearest to said first observation based on a statistical distance metric;

identifying said first observation as a first outlier observation if a residual of said first observation is statistically different from residuals of said first group of observations, wherein said residuals of said first observation and said first group of observations are determined based on a predictive model indicative of a global relationship between a response variable and a plurality of explanatory variables of said global set of observations; and storing an indication that said first observation is said first outlier observation when said residual of said first observation is statistically different from said residuals of said first group of observations.

22. A non-transitory machine-readable storage medium comprising instructions to:

identify, from a global set of observations, a first observation;

identify, from said global set of observations, a first group of observations that are nearest to said first observation based on a statistical distance metric;

identify said first observation as a first outlier observation if a residual of said first observation is statistically different from residuals of said first group of observations, wherein said residuals of said first observation and said first group of observations are determined based on a predictive model indicative of a global relationship between a response variable and a plurality of explanatory variables of said global set of observations; and produce an indication that said first observation is said first outlier observation when said residual of said first observation is statistically different from said residuals of said first group of observations.

* * * * *